US009654471B2

(12) United States Patent
Patvarczki et al.

(10) Patent No.: US 9,654,471 B2
(45) Date of Patent: *May 16, 2017

(54) IDENTIFYING PEERS BY THEIR INTERPERSONAL RELATIONSHIPS

(71) Applicant: Wallrust, Inc., Palo Alto, CA (US)

(72) Inventors: Jozsef Patvarczki, Sunnyvale, CA (US); Marton B. Anka, Windham, NH (US); Endre Tamas, Worcester, MA (US); Adam Kornafeld, Worcester, MA (US)

(73) Assignee: Wallrust, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/275,130

(22) Filed: May 12, 2014

(65) Prior Publication Data

US 2015/0046999 A1 Feb. 12, 2015

Related U.S. Application Data

(63) Continuation of application No. 13/236,675, filed on Sep. 20, 2011, now Pat. No. 8,726,036.

(51) Int. Cl.
*H04L 29/06* (2006.01)
*H04L 9/32* (2006.01)
*H04L 29/08* (2006.01)

(52) U.S. Cl.
CPC ........ *H04L 63/0876* (2013.01); *H04L 9/3231* (2013.01); *H04L 63/0853* (2013.01); *H04L 67/104* (2013.01)

(58) Field of Classification Search
CPC . H04L 9/3231; H04L 67/104; H04L 63/0861; H04L 63/0853; H04L 29/06; H04L 63/0876
USPC ............................................................ 726/7
See application file for complete search history.

(56) References Cited

U.S. PATENT DOCUMENTS

| | | | |
|---|---|---|---|
| 2007/0143407 A1* | 6/2007 | Avritch | G06Q 10/107 709/206 |
| 2007/0208747 A1* | 9/2007 | Puckrin | 707/10 |
| 2008/0263175 A1* | 10/2008 | Naono et al. | 709/217 |
| 2009/0013043 A1* | 1/2009 | Tan | 709/205 |

(Continued)

OTHER PUBLICATIONS

Jain et al, Chronicle Security Against Covert Crawling, ACM, Aug. 19, 2012, pp. 42-50.*

(Continued)

*Primary Examiner* — Bradley Holder
*Assistant Examiner* — Jenise Jackson
(74) *Attorney, Agent, or Firm* — David H. Judson (57) ABSTRACT

According to this disclosure, a user is identified (and selectively granted access to protected resources) by using information that describes the user's interpersonal relationships. This information typically is stored in a datastore, such as a digital address book, an online profile page, or the like. The user's digital address book carries an "acquaintance pattern" that changes dynamically in time. This pattern comprises the information in the user's contact list entries. In this approach, the entropy inherent in this information is distilled into a unique acquaintance digest (or "fingerprint") by normalizing the contact list data, and then applying a cryptographic function to the result.

11 Claims, 4 Drawing Sheets

(56) References Cited

U.S. PATENT DOCUMENTS

2012/0233029 A1\* 9/2012 Piersol .................. G06Q 10/10
  705/27.1
2012/0278633 A1\* 11/2012 Frieder ............... G06F 21/6245
  713/189

OTHER PUBLICATIONS

Lee e tal, Scalable Packet Digesting Schemes for IP Traceback, IEEE, 2004, pp. 1008-1013.\*

\* cited by examiner

FIG. 5

IDENTIFYING PEERS BY THEIR INTERPERSONAL RELATIONSHIPS

TECHNICAL FIELD

This disclosure relates generally to methods and techniques to identify users and devices by dynamically extracting the entropy found in datastores that describe users' interpersonal relationships.

BACKGROUND OF THE RELATED ART

User identification is a common functionality of both online services and offline systems. A crucial aspect of user identification is security. A common way to identify a user is to assign the user a unique identifier that is paired with a password. User access is granted only to someone who can present a valid pair of a unique identifier and a password.

It is a challenging task to ensure that a password provides a sufficient level of security. One method to increase the security of a password is obligating a certain minimum length and enforcing the use of compound combinations of character classes (such as lowercase, uppercase, numerical, and symbols). Such an approach makes it harder for an attacker to correctly guess the password in a finite amount of time without significant computational resources. Another security method, known as password aging, assigns an expiration date to a password and requires that the user change his or her password on a regular basis. This technique helps preclude that a compromised password will be used for any extended time period. All of these techniques promote cryptographically better passwords, but they also hinder everyday use.

It is desirable to provide alternative methods that address the drawbacks of regular password-based authentication methods and that enable robust and secure access to protected resources.

BRIEF SUMMARY

Several observations underlie the security techniques of this disclosure. A first observation is that interpersonal relationships between and among individuals are established under the context of social, cultural and other influences. As a consequence, an individual typically has a number of acquaintance dyads that, by the very nature, form a unique social network. For example, it would be rare to find two people who know the exact same peers. A second observation is that most people keep track of contact information about their acquaintances in a naturally unorganized fashion. These two observations are combined into a method that identifies people, preferably using the interpersonal relationship information they store about their acquaintances.

According to a basic aspect of this disclosure, a user is identified (and selectively granted access to protected resources) by using information that describes the user's interpersonal relationships. This information typically is stored in a datastore, such as a digital address book, an online profile page, or the like. In one embodiment, the digital address book is associated with a software application such as a personal information manager (PIM) executing on a computing device (a desktop machine, a laptop, a tablet device, a cellphone, or any other network-accessible device). As a PIM functions as a personal organizer. An information management tool, a PIM's purpose is to facilitate the recording, tracking and management of certain types of personal information. Each contact entry in the PIM typically comprise a few standard fields, e.g., first name, last name, company name, address(es), telephone number(s), e-mail address(es), fax number(s), and the like. Likewise, an online service profile page also stores general information about the user (e.g., first name, last name, and the like), and this profile page is linked to profile pages of the user's "friends" or other acquaintances in a virtual digital address book structure that is analogous to a PIM-based address book. This interpersonal contact information, which is stored in an address book as a set of contact entries, varies greatly from individual to individual. The method of this disclosure exploits the entropy inherent in a user's contact list information (whether in a standalone digital address book, a set of linked profile pages, or the like) to generate a unique identifier for the user.

According to an embodiment, a user's digital address book is a datastore that carries an "acquaintance pattern" that changes dynamically in time. This pattern comprises the information stored in the user's contact list datastore. According to this disclosure, the entropy inherent in this information is distilled into a unique acquaintance digest (or "fingerprint") by normalizing the contact list data, and then applying a cryptographic function to the result.

According to another aspect of this disclosure, a method of accessing a protected resource begins by receiving a unique identifier, the unique identifier having been generated by applying a cryptographic function to a user's interpersonal relationship information in a datastore. If the unique identifier is verified as associated with the permitted user, access to the protected resource is enabled.

In the alternative, the unique identifier is used to verify that a specific device that generated the identifier belongs to or otherwise associated with a particular user.

The acquaintance digest serves as a secret piece of information that only the owner can present. Thus, it may supplant or augment an existing password-based authentication scheme.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

Figure 1:
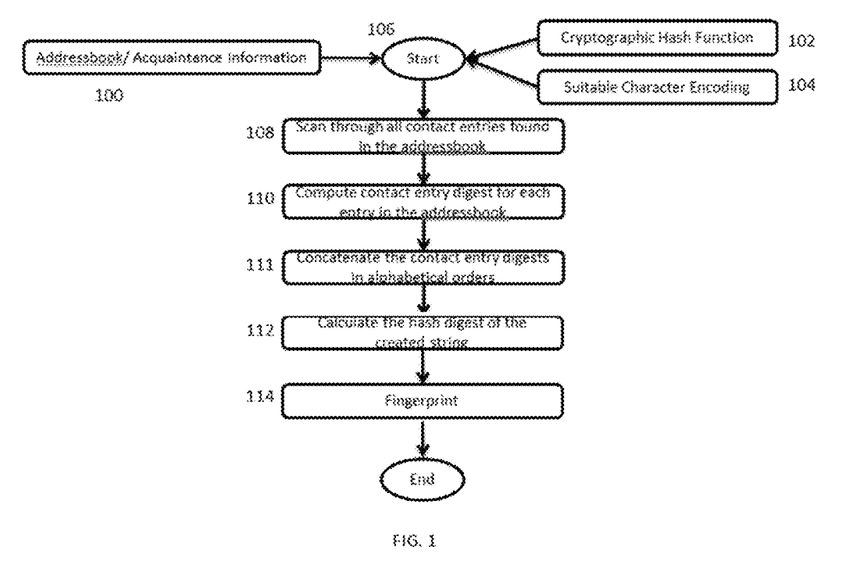
FIG. 1 illustrates a technique for computing an acquaintance digest according to this disclosure.

FIG. 1 is a process flow of a technique for generating an acquaintance digest according to this disclosure. This routine typically is implemented in software, as a set of computer program instructions executed on one or more processors. The technique assumes the existence of a datastore 100 comprising an address book. The address book may be a digital address book of a personal information manager (PIM) application, a set of linked (associated) user profile pages from a social network (e.g., Facebook), or the like. The address book comprises a set of contacts that represent the user's acquaintance information that will be processed by the disclosed technique. The technique also assumes the existence of a cryptographic hash function 102, and a character encoding scheme 104. There may be multiple hash functions, and multiple encoding schemes. The information 100, 102 and 104 may be available at the point of computation, or it may be received from an external source. The computation begins at step 106, and it is preferably carried out as a computational process on one or more machines, devices, or other computing entities. At step 108, a scan is performed through all contact entries found in the address book. At step 110, and for each contact entry identified in step 108 in the address book, a contact entry digest is computed, using the character encoding scheme 104 and the cryptographic hash function 100. At step 110, the contact entry digests generated in step 108 are processed, preferably by a concatenation operation that concatenates the contact entry digests according to a given order (e.g., an alphabetical order). The result is a data string. The routine then continues at step 112. At this step, a hash digest of the data string generated at step 110 is computed, using the cryptographic hash function. The result is an acquaintance digest 114 (or "fingerprint") that uniquely identifies the user as a function of the acquaintance information in the datastore address book 100. This ends the process.

Figure 2:
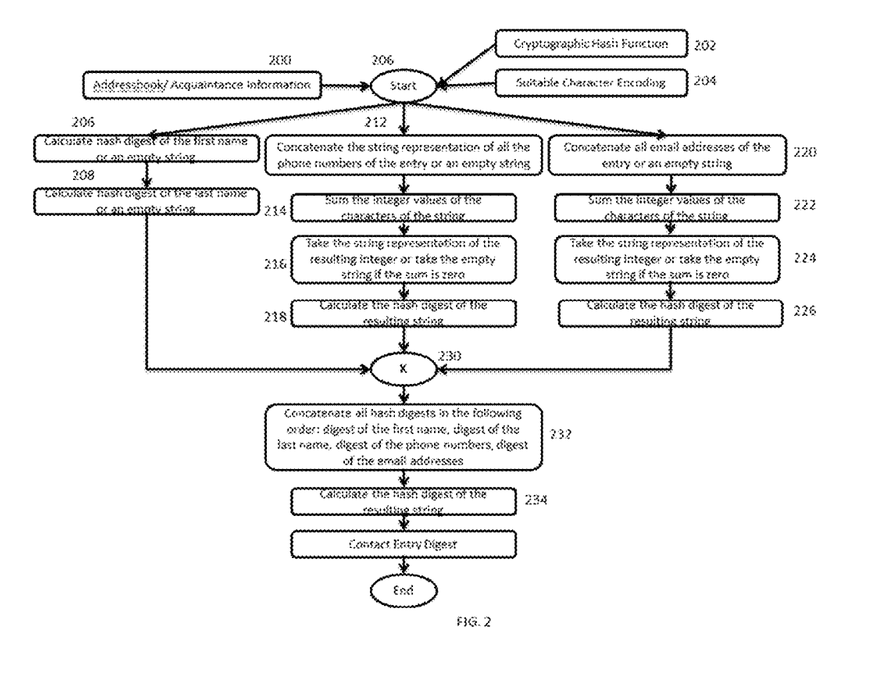
FIG. 2 illustrates the technique of FIG. 1 with additional details describing a preferred approach for computing a contact entry digest.

FIG. 2 describes a preferred embodiment of step 110 of FIG. 1 in additional detail. As noted above, typically this routine is implemented in software, as a set of computer program instructions executed on one or more processors. It is carried out for each contact entry in the address book. As noted, the technique uses information from the datastore 200, one or more hash functions 202, and one or more character encoding schemes 204. The computation begins at step 206.

The left-most portion of the process flow includes steps 208 and 210, which process acquaintance name information, such as first name, last name, and the like, in the particular contact entry of the address book. In particular, at step 208, a hash digest of the first name (or an empty string if no first name is included in the contact entry) is computed. At step 210, a hash digest of the last name (or an empty string if no last name is included in the contact entry) is computed.

The middle portion of the flow includes steps 212, 214, 216 and 218, and these steps concern the processing the phone numbers in the particular contact list entry. Thus, at step 212, a data string representing the concatenation of all the phone numbers of a contact entry (or an empty string if no such numbers are included in the contact entry) is generated. At step 214, the integer values of the characters in the data string (generated in step 212) are summed, with the result being an integer (or an empty string, as the case may be). At step 216, the string is obtained. At step 218, a hash digest of the string is computed.

The right-most portion of the routine includes steps 220, 222, 224 and 226, and these steps process the email addresses in the contact list entry. These operations are similar to those that are used for the phone numbers. Thus, at step 220, a data string representing the concatenation of all the email addresses of a contact entry (or an empty string if no such addresses are included in the contact entry) is generated. At step 222, the integer values of the characters in the data string (generated in step 220) are summed, with the result being an integer (or an empty string, as the case may be). At step 224, the string is obtained. At step 226, a hash digest of the string is computed.

Of course, similar processing may be carried out on other contact list fields in the contact list entry if they exist.

The hash digests generated for each contact list entry are then accumulated at step 230. At step 232, the routine concatenates into a data string all hash digests, preferably in the following order: digest of the first name (from step 208), digest of the last name (from step 210), digest of the phone numbers (from steps 212-218), and digest of the email addresses (from steps 220-226). At step 234, a hash digest of the data string generated in step 232 is computed. This is the contact entry digest for the contact list entry.

As noted, the steps in FIG. 2 preferably are then repeated for each contact list entry until all contact entries have been processed. The resulting digests are then processed as described in step 112 of FIG. 1.

Although the above-described algorithm (wherein each contact list entry is hashed separately, with the results combined in the manner described) provides significant advantages, a variant approach produces a fingerprint by simply concatenating the individual contact list entries (or portions thereof) together and then applying the hash the results. Thus, instead of generating a hash of a first entry, a hash of a second entry, and so forth, the first and second entries may be concatenated together (in whole or in part), with the hash function then applied to the result. This operation is represented by the following hash function H(entry 1 data|entry 2 data|entry 3 data). This approach provides computational efficiencies yet still provides a secure result.

Figure 3:
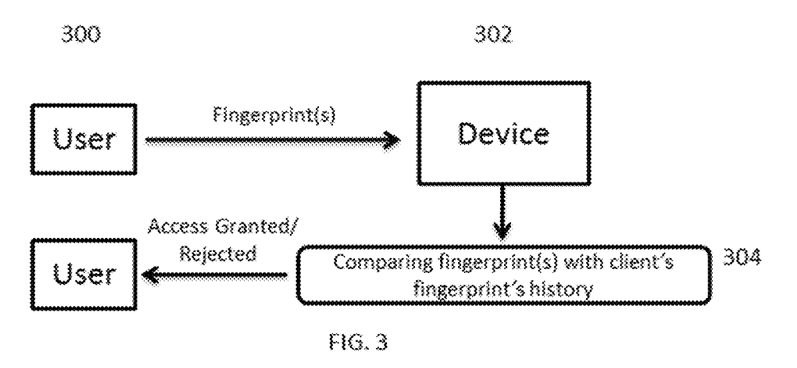
FIG. 3 is a first use case illustrating how the acquaintance digest is used on a device.

FIG. 3 illustrates a first representative use case for the fingerprint. The use case involves a user 300 attempting to access a device 302. In this scenario, the user 300 may possess the fingerprint or has the ability to generate the fingerprint in the manner previously described. The user 300 may be a person, a computing entity, a process, a program, or the like. The device may be any product, service, machine, device, application, program, process, execution thread, file, object, data, or other resource. As illustrated, the user 300 provides the fingerprint to the device 302. The device includes a datastore that comprises a fingerprint history. A fingerprint history typically contains at least the most recent, but possibly all known, valid fingerprint values for the user. In this way, even outdated or deprecated fingerprint values can be used for authentication. As noted above, the fingerprint generated as described herein typically is valid for a given time period given the entropy naturally associated with the data from which the digest is computed. At 304, the device compares the received fingerprint with a fingerprint history. The user is then granted or denied access to the device (or some component thereof) as a result of the comparison.

Figure 4:
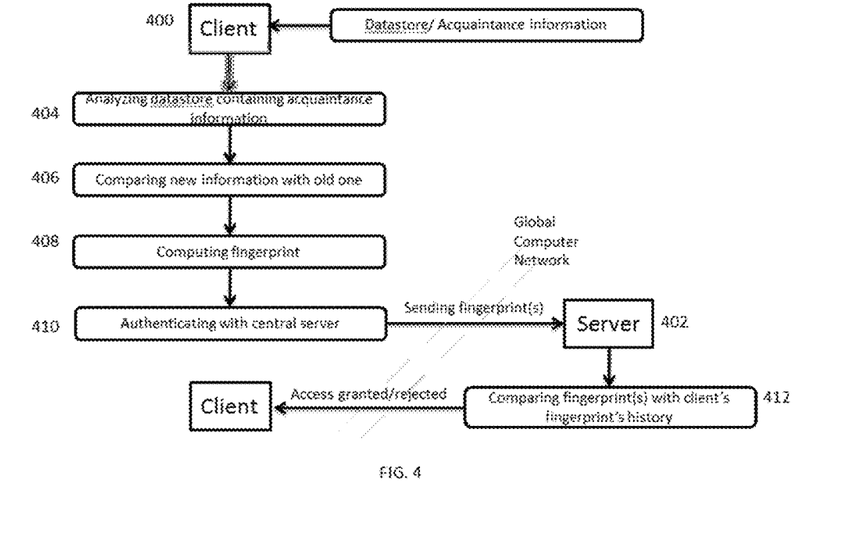
FIG. 4 is a second use case illustrating how the acquaintance digest is used to obtain access to a protected resource in a client-service computing model.

FIG. 4 illustrates a second use case wherein a client 400 having a datastore with acquaintance information desires access to a server 402. The server includes a datastore that stores a client's fingerprint history in the manner previously described. The client 400 executes a routine to generate the digest and use the digest to attempt to access a protected resource associated with the server. The routine here begins at step 404 with the client analyzing the datastore that contains the acquaintance information. At step 406, the routine determines that the information has changed and that a new digest is to be generated. The new digest is computed at step 408 in the manner previously described. At step 410, the client attempts to authenticate to the server 402 using the newly-computed fingerprint. This authentication may occur over a network, such as the public Internet, an internet, a private network, a local area network, any other wireline or wireless network, or any other telecommunication network. During this authentication, the fingerprint generated at step 408 is sent to the server 402. The server 402 then compares the fingerprint with the client's fingerprint history (as previously described) and attempts to validate it. If the fingerprint is validated, the server grants the client access to the protected resource; otherwise, such access is denied.

Thus, in the client-server architecture, a system comprises one or more central servers (such as server 402) that are responsible for handling authentication of clients and storing fingerprints (encrypted or otherwise) including a current fingerprint and a history of previous ones. In this representative (but non-limiting) use case, the final authentication takes place on the server, as has been described. The client is responsible for analyzing the datastore containing acquaintance information, comparing the new information with an old one (if present), computing a fingerprint, and authenticating with the central server.

In a peer-to-peer embodiment, preferably the final decision logic is at the client side (an entry peer in the example), and the client is responsible for handling authentication, storing fingerprints (encrypted or otherwise), and handling the history of fingerprints. In this embodiment, the infrastructure has one or more publicly-available entry peers. These entry peers are responsible for the registration and the authentication steps of the joining peers. If a new peer wants to join the P2P network, it sends its fingerprint(s) to one of the entry peers. The Entry peer checks its history for the incoming fingerprint(s). If there is no match then it stores the fingerprint(s), and sends a list of the known addresses of the already-joined peers with an acknowledgement back to the requestor. If there is a match for at least one incoming fingerprint, then the entry peer stores the new fingerprint information, in a distributed hash database. Thereafter, the entry peer distributes the new peer's fingerprint(s) information using the distributed hash database (or some other transport scheme) across the joined peers. The new peer receives the list and initiates a connection to one of the already-connected peers sending its fingerprint(s) information. The receiver peer checks the distributed hash database for the existence of the fingerprint(s) and grants or rejects access based on the result of the match (at least one of the fingerprints must match). The receiver peer updates the distributed hash database based on the available new fingerprint information for the particular client.

Figure 5:
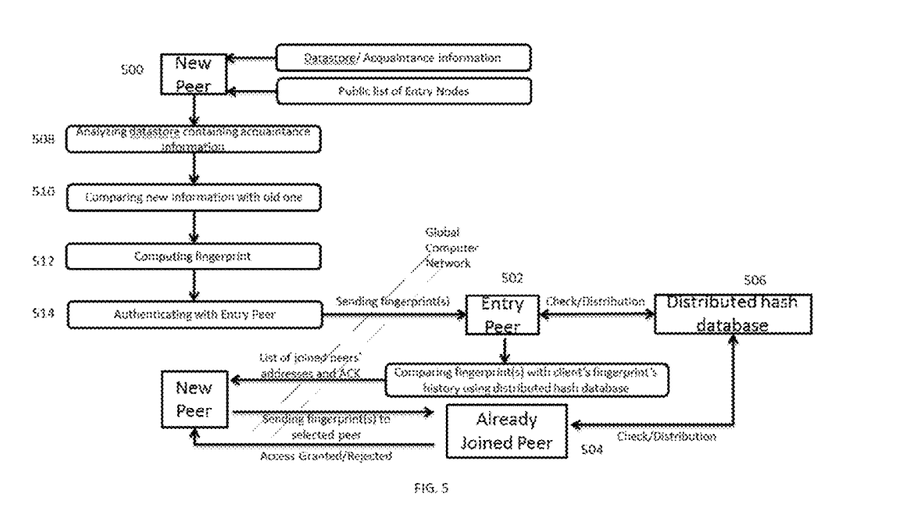
FIG. 5 is a third use case illustrating how the acquaintance digest is used to enable a user device to access and join a peer-to-peer network.

FIG. 5 illustrates the P2P use case. As described, peer 500 can use a fingerprint to join the peer-to-peer (P2P) network comprising at least one other entry peer 502. The peer 500 typically is a machine, such as a laptop, a tablet computer, a mobile device, or the like. Peer 500 has a datastore with acquaintance information, and peer desires to join a peer-to-peer network that includes an entry peer 502, and one or more already-joined peers 504. The peer-to-peer network has an associated distributed hash database 506. The other peers of the network are computing entities, such as machines. The 500 also knows or can obtain a public list of entry nodes for the P2P network, one such node being the entry peer 502. The peer 500 executes a routine to generate the digest and use the digest to attempt to access and join the P2P network. The routine here begins at step 508 with the peer analyzing the datastore that contains the acquaintance information. At step 510, the routine determines that the information has changed and that a new digest is to be generated. The new digest is computed at step 512 in the manner previously described. At step 514, the peer 500 attempts to authenticate to the entry peer 502 using the newly-computed fingerprint. This authentication may occur over a network, such as previously described. During this authentication, the fingerprint generated at step 512 is sent to the entry peer 502, which stores the fingerprint in the distributed hash database 506. At step 514, the entry peer compares the fingerprint with the client's fingerprint history, preferably using information in the database 506. If the fingerprint is valid, the entry peer 502 provides the peer 500 with the addresses of one or more of the already-joined peers 504. The peer 500 then sends the fingerprint to a selected one of the already-join peers, and the selected peer then checks the received fingerprint in the distributed hash database to grant or deny access to the P2P network by the peer.

The above use scenarios are merely representative. Those skilled in the art will appreciate that the fingerprint may be used for other types of authentication and access control that are well-known in the art. Further, the fingerprint technique may be used in other types of computing models, such as cloud-based computing.

As can be seen, the technique provides a way to identify users and automatically grant access to services by using information describing the users' interpersonal relationships stored in datastores. As has been described, such datastores typically are address books or profile pages of online services, although as used herein a "datastore" from which acquaintance information may be mined and processed (into a fingerprint) should be broadly construed to cover any "linked" or associated set of data entries, regardless of where individual entries are stored or obtained. Digital address books are generally found on many devices including, but not limited to, desktop computers, laptops, netbooks, smart devices (such as cell phones, desktop phones, PDAs, tablets, Internet phones, e-book readers), intelligent appliances (such as smart televisions, security systems, smart refrigerators), intelligent cars and intelligent buildings. As has been described, each contact entry found in an address book usually comprises a few standard fields (for example, first name, last name, company name, address(es), telephone number(s), e-mail address(es), fax number(s), etc.). In case of an online service, users' profile pages also store general information about the user (for example, first name, last name, etc.) and can link to profile pages of the users' friends in a structure that is similar to an address book. These datastores are referenced collectively as "address books."

A client can be any device that has an address book, and/or has an applicable connector port to connect devices capable to store fingerprint information (e.g. USB flash drive), and/or has access to an online resource or service on a network and that stores fingerprint data, and/or is capable of operatively connecting to a central server. The application can run locally on the device or on one of the servers of the network that can communicate with the device via the device's network connection. In the standalone (FIG. 3) architecture (FIG. 3), typically there is no connection to the computer network. The decision takes place on the device. The device is responsible for handling authentication, storing fingerprints (encrypted or otherwise), and handling the history of the fingerprints utilizing the memory of the device including volatile and permanent storages (for example, BIOS). Standalone device also provides an interface to connect various devices storing address books or fingerprints. The standalone device reads and/or processes the information found on the connected device and grants or denies access accordingly.

In any of the above-described architectures, a graphical user interface (GUI) of the client application displays different phases of the process, the communication(s) with the server, and the result of the authentication. All three architectures can be combined with Public Key Authentication (PKI) to encrypt the network between the client-server, user-device, or the peers.

The following provides additional details regarding the generation of the unique fingerprint based on the information stored in an address book. The algorithm preferably utilizes a cryptographic hash function such as a secure hash and message digest algorithm. Representative algorithms include, without limitation, MD5 (defined in FIPS 180), SHA-1, SHA-256, SHA-384, SHA-512, and the like. Any existing or later-developed algorithm may be used. These functions calculate a message digest (or digest) for a given input. Preferably, the hash function is chosen upon implementation and is used consistently throughout (digest creation and verification). Whenever the description of the algorithm herein refers to calculating a hash digest, the chosen hash function is used. To maintain cross-platform compatibility of the algorithm, preferably a suitable character encoding (for example, UTF8) is used to encode string values stored in a contact entry. Preferably, when the description of the algorithm herein refers to a character code, it is assumed that the character is encoded with the chosen encoding. As previously described in FIG. 1, the algorithm scans through all contact entries found in the address book and computes a unique value for each contact entry. Each contact list entry preferably is processed in a similar manner, iteratively, until all entries are processed. The resulting data strings and digests are then used to compute the fingerprint, as has been described.

In particular, the routine calculates the hash digest of the first name value of the contact entry or calculates the hash digest of an empty string if the contact entry does not have a first name value. The routine then calculates the hash value of the last name value of the contact entry or calculates the hash digest of an empty string if the contact entry does not have a last name value. These steps may be reversed.

The routine concatenates the string representation of all the phone numbers as they appear in the contact entry (phone numbers can include any character) or takes an empty string if the contact entry does not store any phone numbers. The integer values of the characters of the string are then summed. The string representation of the resulting integer (or an empty string if the sum is zero) is then applied as the input to the hash function to compute a hash digest of the string. The email addresses are processed in a similar manner: concatenate all the email addresses as they appear in the contact entry or take an empty string if the contact entry does not store any email addresses; sum the integer values of the characters of the string; take the string representation of the resulting integer (or take an empty string if the sum is zero) and calculate the hash digest of the string. The routine then concatenates all the hash digests calculated so far, preferably in this order: digest of first name, digest of last name, digest of phone numbers, digest of email addresses and calculate the hash digest of the result string.

By taking into account only the indicated fields the contact entries are normalized to remove unnecessary or superfluous fields that may not be present on all devices. The hash digest of an empty contact entry can also be calculated and it adds to the entropy of the address book. Preferably, the final fingerprint is calculated by concatenating the contact entry digests in alphabetical order and calculating the hash digest of the resulting string. This hash digest is the final fingerprint that represents a given address book and uniquely identifies the owner of the address book (or, more generally, a person associated therewith). The fingerprint can also be calculated for an empty address book. However, because the fingerprint of an empty address book is a known value, such fingerprints can be denied upon any usage.

Optionally, the fingerprint can be combined with further options to enhance the security benefits. For example, a user can provide a personal identification number (PIN) in combination with the fingerprint. A unique device identifier can also be combined with the fingerprint to distinguish devices used to access a service. In an alternative embodiment, e.g., for an online banking application, the identifier merely acts as a user name, namely, an identifier that uniquely identifies the user but that is not necessarily secret. In this variant, an additional PIN or password is used together with the identifier to facilitate access to the protected resource.

Preferably, the client stores and keeps track of the hash digest of each contact entry in combination with the address book identifier of the contact entry. This ensures that the client can detect the deletion of a contact entry, the creation of a new contact entry, or the modification of an existing contact entry. The client routine may be adapted to react to such changes of the address book in several ways. For example, the client can consider a slight modification in a densely-populated address book to be normal behavior and can recalculate the new fingerprint of the address book. On the other hand, the client can consider a considerable change in the address book as an indication that the device hosting the address book has switched owners, and it can then take actions to verify the identity of the user. The user can verify his identity in several ways depending on implementation, e.g., by presenting the user's PIN code.

Synchronizing an address book across several devices allows users to authenticate using several devices. In one embodiment, if the user changes the content of the address book on one device, the address book should be synchronized across all devices to be able to authenticate using other devices. In another embodiment, as has been described, the server maintains a fingerprint history for every user. This history contains at least the most recent, but possibly all known, valid fingerprint values for a particular user. In this way, even outdated or deprecated fingerprint values can be used for authentication. A client application that has access to only an outdated address book can send an outdated fingerprint value to a server. Authentication may then succeed as long as the server can locate that fingerprint in the history. When a client application detects a change in the address book, it can send the old and the new fingerprint to the server. If the server recognizes the old fingerprint value it authorizes the client, and preferably it also stores the received new value of the fingerprint in the history. If there is no match for the old fingerprint in the server's fingerprint history, preferably authentication is not possible (and access is denied) unless synchronizing the address book across devices.

Additionally, more than one old fingerprint can be used for authentication to increase the level of security. For example, the client may send a bundle of fingerprints based on its own fingerprint history and all or the majority of them should match with the data in the server's fingerprint history (before access is granted). In this variant, the total number of the fingerprints in the bundle is determined by a sliding window size. The size of the window can be set by the client selecting the required security level, or it can be dynamically set by the server, e.g., based on the required level of security.

In another embodiment, access to a service can be restricted to several users providing their fingerprints at the same time. In this scenario, the server implements a secret sharing technique whereby the individual fingerprints. The Rabin secret sharing algorithm may be used for this purpose.

Passwords are said to be cryptographically more secure if their validity is limited in time. As has been described, a user's interpersonal relationships are dynamic systems that change continuously during their existence. This property ensures that a given fingerprint may only have validity for a given time. Previous fingerprints can be invalidated automatically, as the fingerprint changes every time the user updates the information stored in his address book.

Another aspect of this disclosure is how to replace the manual methods of assigning unique identifiers to users otherwise known as usernames by automated methods. A device can be identified by unique identification strings assigned to a device (for example, IP address, Media Access Control (MAC) address, phone number, or the like). Moreover, using the described technique, universally unique identifiers (UUIDs) can be assigned to devices to serve as identifiers. These methods can also be used in combination with the other. Thus, for example, devices assigned with such unique identifiers indirectly identify users as well. As a consequence of this approach, users do not have to manually pick usernames to access a certain service and also several devices can identify a single user.

Thus, the disclosed technique can assign unique identifiers to devices to allow their users to access restricted services. Users are identified partly by the device they are using and partly by a fingerprint calculated from information stored in the user's address book, as has been described.

Aspects of this disclosure (such as the calculation of the acquaintance digest) may be practiced, typically in software, on one or more machines. Generalizing, a machine typically comprises commodity hardware and software, storage (e.g., disks, disk arrays, and the like) and memory (RAM, ROM, and the like). The particular machines used in the system are not a limitation of the disclosed subject matter. A given machine includes network interfaces and software to connect the machine to a network in the usual manner. The subject matter may be implemented as a standalone product, or as a managed service using a set of machines, which are connected or connectable to one or more networks. More generally, the product or service is provided using a set of one or more computing-related entities (systems, machines, processes, programs, libraries, functions, or the like) that together facilitate or provide the inventive functionality described above. In a typical implementation, the service comprises a set of one or more computers. A representative machine is a network-based server running commodity (e.g. Pentium-class) hardware, an operating system (e.g., Linux, Windows, OS-X, or the like), an application runtime environment (e.g., Java, .ASP), and a set of applications or processes (e.g., AJAX technologies, Java applets or servlets, linkable libraries, native code, or the like, depending on platform), that provide the functionality of a given system or subsystem. A display may be used to provide a display output. As described, the product or service may be implemented in a standalone server, or across a distributed set of machines. Typically, a server connects to the publicly-routable Internet, an intranet, a private network, or any combination thereof, depending on the desired implementation environment.

Having described our invention, what we now claim is as follows.

The invention claimed is:

1. A non-transitory computer-readable storage medium storing a computer readable program of computer instructions, the computer instructions executed by a processor to:
   scan a list to identify a set of entries, at least one entry of the set of entries being an identifier associated with a device, wherein the identifier associated with the device is one of: Internet Protocol (IP) address, and Media Access Control (MAC) address;
   for each entry in the identified set of entries including any entry that does not have a value, apply a cryptographic function to the entry to generate a digest for the entry;
   order the digests generated for the entries by concatenating the digests into a data string;
   apply the cryptographic function to the data string to generate a fingerprint associated with the list; and
   use the fingerprint in lieu of a username to obtain access to a resource.

2. The computer-readable storage medium as described in claim 1 wherein list also includes one or more contact list entries, at least one contact list entry including one of: first name, last name, telephone number, and e-mail address.

3. The computer-readable storage medium as described in claim 1 further including associating the fingerprint with a personal identifier to obtain access to the resource.

4. The computer-readable storage medium as described in claim 1 further including re-generating the fingerprint upon an update to the list.

5. The computer-readable storage medium as described in claim 1 further including using additional information associated with the fingerprint to obtain access to the resource.

6. The computer-readable storage medium as described in claim 5 wherein the additional information associated with the fingerprint is at least one other previously-generated fingerprint.

7. The computer-readable storage medium as described in claim 1 wherein the resource is one of: a product, a service, a machine, a group of machines, a device, an application, a program, a process, an execution thread, a file, an object, a data set, and given data.

8. A computer program product embodied on a non-transitory computer-readable medium, the computer program product comprising computer instructions executed by a processor to:
   process information in a data set to generate a fingerprint, the information in the data set including first data that is associated with a device identifier that only indirectly identifies a user, and second data that directly identifies an acquaintance of the user, the second data including a list, the fingerprint being generated by applying a cryptographic function over a concatenation of
   a first digest and a second digest, the first digest having been generated from the first data, and the second digest having been generated from the second data by (i) scanning the list to identify a set of entries, (ii) for each entry in the identified set of entries, including any entry that does not have a value, applying the cryptographic function to the entry to generate a hash for the entry, (iii) order the hashes generated for the entries by concatenating the hashes into a data string, and (iv) applying the cryptographic function to the data string to generate the second digest; and
   use the fingerprint in lieu of a username associated with the user to obtain access to a resource.

9. The computer program product as described in claim 8, wherein the resource is one of: a product, a service, a machine, a group of machines, a device, an application, a program, a process, an execution thread, a file, an object, a data set, and given data.

10. The computer program product as described in claim 9 wherein the group of machines include a peer-to-peer network.

11. The computer program product as described in claim 10 wherein the device identifier is one of: IP address, and Media Access Control (MAC) address.

* * * * *